(12) United States Patent
Choe et al.

(10) Patent No.: US 9,124,794 B2
(45) Date of Patent: Sep. 1, 2015

(54) METHOD AND APPARATUS FOR CAPTURING IMAGE IN PORTABLE TERMINAL

(75) Inventors: Jeong-In Choe, Chungcheongnam-do (KR); Jeong-Wook Seo, Daegu (KR); Sung-Hoon Kim, Gyeonggi-do (KR); Sun-Mi Kwon, Gyeongsangbuk-do (KR); Ji-Yoon Ahn, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 205 days.

(21) Appl. No.: 13/219,915

(22) Filed: Aug. 29, 2011

(65) Prior Publication Data

US 2012/0050575 A1 Mar. 1, 2012

(30) Foreign Application Priority Data

Aug. 30, 2010 (KR) .................. 10-2010-0084208

(51) Int. Cl.
*H04N 5/232* (2006.01)
*H04N 5/335* (2011.01)

(52) U.S. Cl.
CPC ........... *H04N 5/232* (2013.01); *H04N 5/23229* (2013.01); *H04N 5/23293* (2013.01); *H04N 5/335* (2013.01)

(58) Field of Classification Search
CPC .............. H04N 5/232; H04N 5/23229; H04N 5/23293; H04N 5/335
USPC .................... 348/333.01, 333.11, 333.12
See application file for complete search history.

(56) References Cited

U.S. PATENT DOCUMENTS

| | | | |
|---|---|---|---|
| RE38,079 E * | 4/2003 | Washino et al. | 348/722 |
| 8,305,464 B2 * | 11/2012 | Suzuki | 348/231.99 |
| 2005/0046725 A1 * | 3/2005 | Sasagawa | 348/333.01 |
| 2005/0231631 A1 | 10/2005 | Miyazaki | |
| 2006/0132636 A1 | 6/2006 | Miyata | |
| 2007/0030374 A1 * | 2/2007 | Ishii | 348/333.01 |
| 2008/0129854 A1 | 6/2008 | Onoda et al. | |
| 2008/0136942 A1 * | 6/2008 | Yoon et al. | 348/231.99 |
| 2009/0225179 A1 * | 9/2009 | Ohashi et al. | 348/222.1 |
| 2011/0019936 A1 * | 1/2011 | Bhrugumalla | 382/298 |
| 2011/0261217 A1 * | 10/2011 | Muukki et al. | 348/222.1 |
| 2011/0261228 A1 * | 10/2011 | Peng et al. | 348/231.6 |

FOREIGN PATENT DOCUMENTS

| | | | | |
|---|---|---|---|---|
| JP | 3160893 | 2/2001 | | H04N 5/225 |
| JP | 2002-359807 | 12/2002 | | H04N 5/91 |

* cited by examiner

*Primary Examiner* — Daniel M Pasiewicz
(74) *Attorney, Agent, or Firm* — Cha & Reiter, LLC

(57) ABSTRACT

The present disclosure relates to a method and an apparatus for capturing an image in a portable terminal. Upon receiving an image for preview and an image for capture simultaneously by a camera module, the controller simultaneously outputs the image for the preview and the image for the capture to a main controller during a simultaneous output mode. The received image for the preview is displayed and stored for a predetermined time period for a subsequent retrieval, so that when a capture key is pressed to capture a target object, the stored image corresponding to a time point at which the capture key is activated is retrieved and stored.

13 Claims, 3 Drawing Sheets

METHOD AND APPARATUS FOR CAPTURING IMAGE IN PORTABLE TERMINAL

CLAIM OF PRIORITY

This application claims priority under 35 U.S.C. §119(a) to a Korean Patent Application entitled "Method and Apparatus for Capturing Image in Portable Terminal" filed in the Korean Intellectual Property Office on Aug. 30, 2010 and assigned Serial No. 10-2010-0084208, the contents of which are incorporated herein by reference.

BACKGROUND OF THE INVENTION

1. Field of the Invention

The present invention relates to a portable terminal, and more particularly to a method and an apparatus for capturing an image in a portable terminal.

2. Description of the Related Art

A portable terminal is an electronic device providing a function in which a user exchanges voice and data communication with another user while the user is moving. With the diversification and development of an environment for mobile communication, the user may now use an Audio On Demand (AOD) or Video On Demand (VOD) services to communicate with another user in real-time through the use of a camera installed in the portable terminal, download and play a game application, or watch Digital Multimedia Broadcasting (DMB) by using a DMB receiver.

When the portable terminal enters a capture mode for capturing an image, the camera module is driven to change to a preview mode. Next, an image provided by the camera module is displayed by a display unit of the portable terminal.

When a capture key (e.g. a shutter key) for capturing an image (e.g. a still image) is pressed in the preview mode, the camera module captures an image only after being changed from the preview mode to the capture mode. At this time, the camera module needs a predetermined time period to be changed from the preview mode to the capture mode.

For example, the camera module needs 300 to 700 ms to be changed from the preview mode to the capture mode, and this time period implies that a delay of 300 to 700 ms occurs between a time point of the user's pressing the capture key and a time point of actually capturing an image by the camera module.

Namely, due to a shutter lag phenomenon caused by the delay resulting from the above mode change, inconvenience is caused to the user in that when capturing an image, he/she cannot but capture a target at a desired time point.

Therefore, there has been a need for solving the above shutter lag phenomenon as soon as possible.

SUMMARY OF THE INVENTION

Accordingly, the present invention provides a method and an apparatus for capturing an image in a portable terminal, by which it is possible to solve a shutter lag phenomenon caused by a mode change in a camera module when capturing an image.

In accordance with an aspect of the present invention, a method for capturing an image in a portable terminal includes: identifying an output setting when entering a camera mode; receiving an image for preview and an image for capture by controlling a camera module to simultaneously output the image for the preview and the image for the capture when the identified output setting is a simultaneous output mode; and displaying and storing the received image for the preview for a predetermined time period, and when a capture key is pressed to capture a target object, the stored image corresponding to a time point at which the capture key is pressed is retrieved as the target object.

In accordance with another aspect of the present invention, an apparatus for capturing an image in a portable terminal includes: a camera module for converting a light signal received through a lens to an electrical image signal and then outputting the electrical image signal; and a controller for controlling a camera module to simultaneously output an image for preview and an image for capture when determining that an output setting is a simultaneous output mode, and receiving the image for the preview and then displaying the received image for the preview through a display unit, wherein when a capture key is pressed to capture a target object, the stored image corresponding to a time point at which the capture key is pressed is retrieved as the target object.

In accordance with another aspect of the present invention, an apparatus for capturing an image in a portable terminal includes: a camera module having a simultaneous output mode and a single output mode, a memory; and a controller for controlling the camera module to simultaneously output an image for a preview and for a capture during the simultaneous output mode, and displaying and storing the received image for the preview for a predetermined time period for a subsequent retrieval, wherein when a capture key is pressed, capturing a target object in real-time using the stored received image a time point at which the capture key is pressed.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

Figure 1:
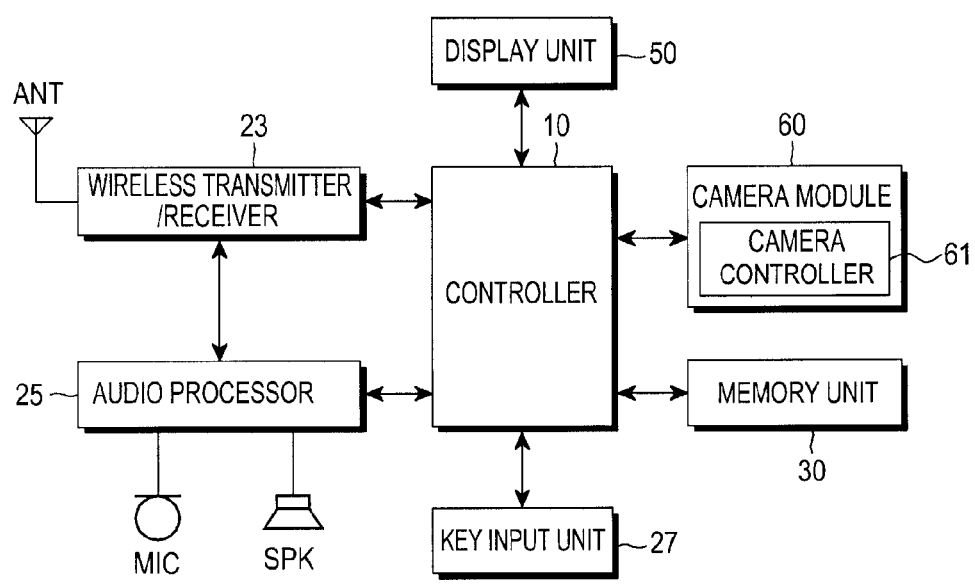
FIG. 1 is a block diagram illustrating the configuration of a portable terminal according to an exemplary embodiment of the present invention.

FIG. 1 is a block diagram illustrating the configuration of a portable terminal according to an exemplary embodiment of the present invention. Although devices, including a GPS (Global Positioning System) module, a camera module, a Bluetooth module, a Wi-Fi (Wireless Fidelity) module, an acceleration sensor, a proximity sensor, a Geo-magnetic sensor, a DMB (Digital Media Broadcasting) receiver, etc., which may be included in a portable terminal, are not shown in FIG. 1, it should be apparent to those skilled in the art that these devices may be included in a portable terminal according to an exemplary embodiment of the present invention in order to provide the relevant functions of these devices.

The portable terminal according to an exemplary embodiment of the present invention, which is a mobile electronic device, may be either a videophone, a mobile phone, a smart phone, an IMT-2000 (International Mobile Telecommunication 2000) terminal, a WCDMA (Wideband Code Division Multiple Access) terminal, a UMTS (Universal Mobile Telecommunication Service) terminal, a PDA (Personal Digital Assistant), a PMP (Portable Multimedia Player), a DMB (Digital Multimedia Broadcasting) receiver, a PC (Personal Computer), a desktop computer, or a laptop computer.

Referring to FIG. 1, a wireless transmitter/receiver 23 includes an RF (Radio Frequency) unit and a modem (modulator/demodulator). The RF unit includes an RF transmitter for upconverting the frequency of a signal to be transmitted and then amplifying the frequency-upconverted signal, an RF receiver for low-noise amplifying a received signal and then downconverting the frequency of the low-noise amplified signal, etc. The modem includes a transmitter for encoding and modulating a signal to be transmitted, a receiver for demodulating and decoding a signal received by the RF unit, etc.

An audio processor 25 may include a codec (coder/decoder), which may include a data codec and an audio codec. The data codec processes packet data, etc., and the audio codec processes audio signals including voice, a multimedia file, etc. The audio processor 25 converts a digital audio signal, which has been received by the modem, to an analog signal through the audio codec, and then reproduces the analog signal. Also, the audio processor 25 converts an analog audio signal, which is generated from a microphone, to a digital audio signal through the audio codec, and then transmits the digital audio signal to the modem. The codec may be separately provided, or may be included in a controller 10 of the portable terminal.

A key input unit 27 may include keys for inputting numbers and text information and function keys for setting various functions, either a touchpad or the like. When a display unit 50 according to an exemplary embodiment of the present invention is implemented by a touchscreen, the key input unit 27 according to an exemplary embodiment of the present invention may be excluded from the configuration of the portable terminal, or may include only a preset minimum number of keys. Therefore, the display unit 50 may replace some of key input functions of the key input unit 27 by the functions of itself.

A memory unit 30 may include a program memory and a data memory. The program memory stores programs for controlling a general operation of the portable terminal. The memory unit 30 according to an exemplary embodiment of the present invention may include external memories, including a CF (Compact Flash) memory card, an SD (Secure Digital) memory card, a Micro-SD (Micro Secure Digital) memory card, a Mini-SD (Mini Secure Digital) memory card, an XD (Extreme Digital) memory card, a memory stick, etc.

The display unit 50 may be implemented by an LCD (Liquid Crystal Display), and/or an OLED (Organic Light-Emitting Diode, such as either a PMOLED (Passive Matrix Organic LED) or an AMOLED (Active Matrix Organic LED)), and outputs various pieces of display information provided by the portable terminal. When the display unit 50 according to an exemplary embodiment of the present invention includes a touchscreen, it may serve as an input unit for controlling the portable terminal, together with the key input unit 27.

A camera module 60 converts a light signal, which is received (or is captured) through a lens, to an electrical image signal, and then outputs the electrical image signal. The camera module 60 includes a lens (not shown) for collecting light and then delivering the collected light to a camera sensor, the camera sensor (not shown) for converting a captured light signal to an electrical image signal when capturing an image, a camera memory (not shown) capable of temporarily storing a captured image, a flash (not shown) providing an appropriate amount of light depending on an ambient situation when an image is captured, and a camera controller 6 for controlling an overall operation of the camera module 60 and converting a captured analog image signal to digital data through the camera sensor.

Specifically, the camera sensor may include at least one lens. The camera sensor may be either a CCD (Charge-Coupled Device) sensor, a CMOS (Complementary Metal-Oxide Semiconductor) sensor or the like. The camera controller 61 may be implemented by either an ISP (Image Signal Processor) or a DSP (Digital Signal Processor). In this case, the camera sensor and the camera controller 61 may be implemented as one unit, or may be implemented as separate elements.

The flash corresponding to a component of a camera uses, as a light source for capture, discharge light which is instantaneously generated when a high-voltage DC (Direct Current) current flows through a xenon discharge tube. Although the flash is usually called strobo, the name "strobo" is a brand name, and is also called electronic flash or speed flash. The DC electricity of high voltage, which is a power source of the flash, is obtained by raising the voltage of DC electricity of laminated batteries to necessary high voltage. The types of flashes may include a clip-on type having a GN (Guide Number) ranging from 14 to 30 and a clip type having a GN ranging from 30 to 50. Since a typical duration of the light impulse is very short (i.e. about $1/1,000$ second) and is as bright as white light (i.e. natural light), the flash serves as a main light source of artificial light.

The camera controller 61 controls the camera module 60 to output an image, which has been captured (or received) through the lens, the camera sensor, etc., to the controller 10, as an image for capture. Namely, the camera controller 61 captures an image by using a setting (e.g. a capture resolution), and includes a codec capable of compressing the captured image to either a JPEG (Joint Photographic Coding Experts Group) format or an MPEG (Moving Picture Experts Group) format, which is suitable for being processed by the controller 10 of the portable terminal. Then, the camera controller 61 may output the image, which has been compressed in the JPEG or MPEG format by the above codec, to the controller 10 of the portable terminal through the codec.

Therefore, in an exemplary embodiment of the present invention, an image for capture is an image captured by using settings (e.g. settings related to capture including a resolution, an aperture value, an exposure value, etc.) selected by the user with the pressing of the capture key. Namely, it signifies an image obtained by compressing (or converting) the image, which has been captured through the lens, the camera sensor, etc., to a format, such as the JPEG or MPEG format, which can be processed by the controller 10.

On the other hand, the camera controller 61 controls the camera module 60 to output an image, which has been captured (or received) through the lens, the camera sensor, etc., to the controller 10, as an image for preview. The camera controller 61 first converts a captured image signal to digital data through the camera sensor, and converts the above digital data to data in a YUV format and then outputs the data in the YUV format to the controller 10. Herein, YUV, which includes a Y component indicating luminance, a U (i.e. Cb) component indicating chrominance, and a V (i.e. Cr) component indicating chroma, is a scheme for expressing pixels. Since in the YUV scheme, transmission can be performed in a narrower bandwidth than in a typical RGB scheme, the YUV scheme is suitable for displaying an image for a preview screen. Therefore, the camera controller 61 according to an exemplary embodiment of the present invention converts the image, which has been received through the lens and the camera sensor, to an image in the YUV format, and then outputs the image in the YUV format to the controller 10, as an image for preview.

Meanwhile, when an output setting related to the camera module 60 is a simultaneous output mode, the camera controller 61 according to an exemplary embodiment of the present invention controls the camera module 60 to simultaneously output the image, which has been received through the lens and the camera sensor, as images of two types including an image for preview and an image for capture. Herein, the image for preview, which is an image having a lower resolution than the image for capture obtained by actually capturing a target object, signifies an image which enables the user to previously view the target object intended to be captured and a composition for capturing the target object. For example, when an image obtained by actually capturing the target object is the image for capture, an image, which is obtained by converting this image for capture to an image having a low resolution in order to fit the preview, can be understood as the image for preview.

The controller 10 may control an overall operation of the portable terminal according to an exemplary embodiment of the present invention, and may change and control the operation of the portable terminal by the user's input provided by the key input unit 27 or the display unit 50. The controller 10 according to an exemplary embodiment of the present invention determines whether the camera module 60 simultaneously outputs the image for preview and the image for capture, based on an output setting related to the camera module 60. The operation of the controller 10 according to an exemplary embodiment of the present invention will be continuously described with reference to FIG. 2.

Figure 2:
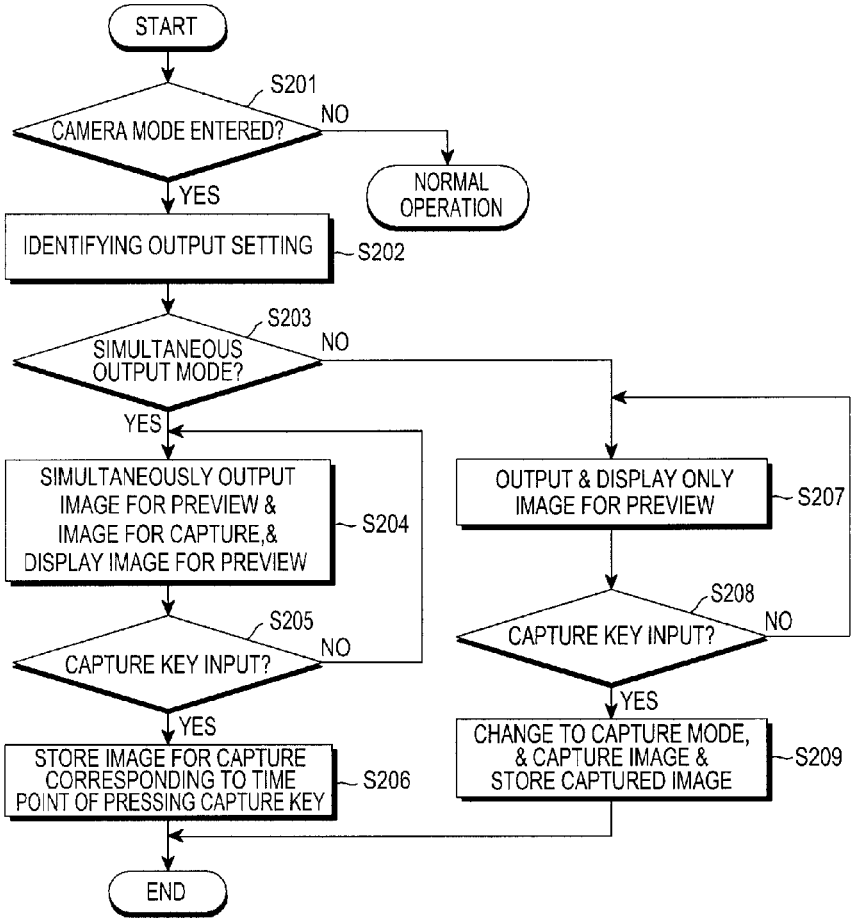
FIG. 2 is a flowchart showing a method for capturing an image according to an exemplary embodiment of the present invention.

FIG. 2 is a flowchart showing a method for capturing an image according to an exemplary embodiment of the present invention.

In steps S201 and S202, when determining that a user has requested entrance to a camera mode, the controller 10 identifies an output setting related to the camera module 60.

By selecting the execution of a predetermined menu or application and then driving the camera module 60, the user can request the entrance to the camera mode. In response to the user's request, the controller 10 identifies the output setting related to the camera module 60.

In an exemplary embodiment of the present invention, output settings include (1) a simultaneous output mode and (2) a single output mode. The simultaneous output mode signifies a mode in which an image, which has been received through the camera module 60 as in an exemplary embodiment of the present invention, is simultaneously output from the camera module 60 as an image for preview and an image for capture. The single output mode signifies a mode in which while only an image for preview is first displayed by the display unit 50 during a preview mode as in the prior art. If the pressing of a capture key is identified, the camera module is changed from the preview mode to a capture mode and then only an image for capture is output from the camera module.

In steps S203 and S204, when determining that the output setting is the simultaneous output mode, the controller 10 controls the camera controller 61 to simultaneously output an image for preview and an image for capture from the camera module 60, and then controls the display unit 50 to display the image for preview.

Figure 3A:
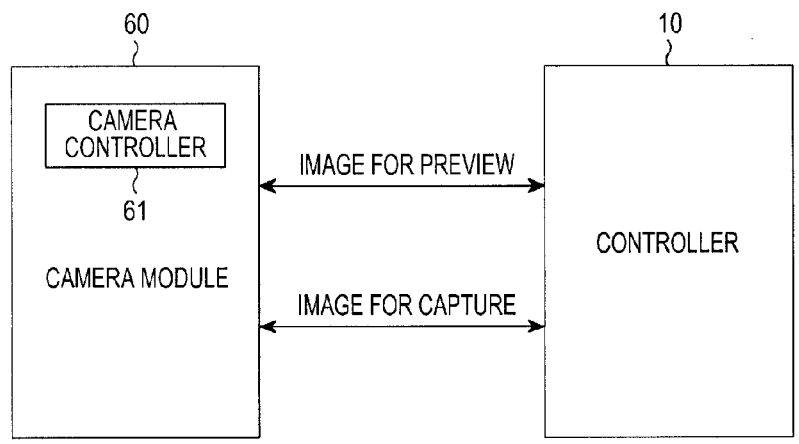
FIGS. 3A and 3B are illustrative views showing a method for capturing an image according to an exemplary embodiment of the present invention.

When determining that the output setting is the simultaneous output mode, the controller 10 of the portable terminal controls the camera controller 61 to simultaneously output an image, which has been received through the lens, the camera sensor, etc., at a predetermined frame rate, as the image for preview and the image for capture. Then, the camera controller 61 simultaneously outputs the image for preview and the image for capture to the controller 10, as shown in FIG. 3A.

After receiving the image for preview (e.g. a thumbnail image in the YUV format) and processing (e.g. resizing) the received image for preview in order to fit a resolution of the display unit 50, the controller 10 outputs the resized image for preview through the display unit 50. The user identifies a target object, which the user can capture through the camera module 60, in real-time by using the image for preview which has been resized and is displayed by the display unit 50.

Meanwhile, the controller 10 may continue to temporarily store the received images for capture in the memory unit 30, and then secure the capacity of the memory unit 30 by deleting the relevant received images for capture by predetermined time periods (e.g. 1 second).

In steps S205 and S206, when determining that the user has pressed the capture key, the controller 10 stores an image for capture corresponding to a time point of the user's pressing the capture key.

When determining a target object, which is intended to be captured, and the composition of the target object by using the image for preview displayed by the display unit 50, the user requests the controller 10 to capture a desired image by pressing the capture key provided by the key input unit 27 or the display unit 50. The controller 10 may store an image for capture (e.g. an image for capture corresponding to an image for preview displayed at the time point of the user's pressing the capture key) corresponding to the time point of the user's pressing the capture key in response to the user's request. According to user's request, the controller 10 may display the stored image (or the stored images) for capture through the display unit 50.

According to an exemplary embodiment of the present invention described in steps S204 to S206 as described above, the user can capture an image at the moment of the user's pressing the shutter key without a shutter lag phenomenon while identifying the image for preview.

In steps S207 to S209, the controller 10 controls the camera controller 61 to output only an image for preview from the camera module 60, and then controls the display unit 50 to display the received image for preview. When the user presses the capture key, the controller 10 changes to a capture mode, and then captures an image and stores the captured image.

In steps S207 to S209, a description is made of the example where the result of the determination in step S203 shows that the output setting is the single output mode which is the same as that of the prior art.

Figure 3B:
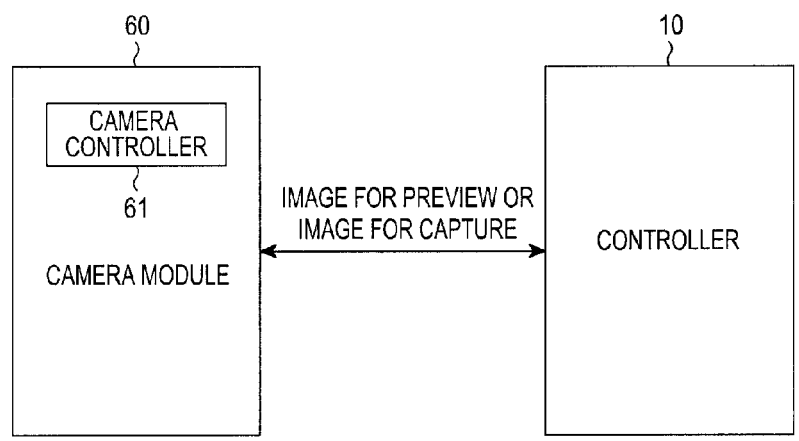

In the single output mode, the controller 10 enters to a preview mode, and then controls the camera controller 61 of the camera module 60 to output only an image for preview as shown FIG. 3B. Next, the controller 10 receives the image for preview, and then controls the display unit 50 to display the received image for preview, after resizing the received image for preview.

Thereafter, when determining that the user has pressed the capture key, the controller 10 changes from the preview mode to a capture mode, and then receives and stores an image (i.e. an image for capture), which has been captured by the camera module 60. At this time, since a time delay results from a mode change from the preview mode to the capture mode as described above, an image corresponding to the time point of the user's pressing the capture key and an image, which is captured and then stored after changing to the capture mode, have their capture time points different by the delayed time period.

Meanwhile, when an image for preview and an image for capture are simultaneously output according to an exemplary embodiment of the present invention, there is a possible increase in the power consumption of the portable terminal depending on the load of the camera module 60 and the controller 10. Due to the increase in the power consumption of the portable terminal, the amount of time used by the portable terminal may be reduced. Therefore, the present invention may provide a function, by which the display unit 50 may display whether an output setting of the camera module 60 is a simultaneous output mode or a single output mode through the modification of an exemplary embodiment thereof and then the user may change between the simultaneous output mode and the single output mode as the need arises after identifying the displayed mode.

According to the present invention, when an image is captured, by solving a shutter lag phenomenon caused by a mode change in a camera module, it is possible to cause a preview image at a time point of pressing a capture key to be the same as an actually captured image.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described in detail with reference to certain exemplary embodiments thereof, the above-described exemplary embodiments are only for an illustrative purpose and are not meant to be a limitation of the present invention. Therefore, changes in the elements, such that an element may be equally replaced by another element in an embodiment of the present invention without departing from the technical art or field of the present invention provided by the appended claims, will fall within the scope of the present invention. Accordingly, the spirit and scope of the present invention must be defined not by the described embodiments thereof but by the appended claims and equivalents of the appended claims.

What is claimed is:

1. A method for capturing a real-time image in an electronic device, the method comprising:
    identifying an output setting when entering a camera mode;
    receiving, by a camera module, an image for both a preview image and a capture image;
    controlling a camera module to simultaneously output, when a simultaneous output mode is activated, first data for the preview image, and second data for the capture image, wherein as output by the camera module, the second data is higher resolution data than the first data;
    generating the preview image from the first data, the generating comprising processing the first data so as to resize an image represented by the first data to match a resolution of a display unit that displays the preview image, and displaying the resized image as the preview image; and
    temporarily storing the second data;
    wherein when a capture key is pressed to finally capture an image at a time point at which a current preview image is displayed, the stored second data corresponding to the current preview image is retrieved as final capture image data.

2. The method as claimed in claim 1, wherein the first data for the preview image is obtained by converting the received image by the camera module to a YUV format.

3. The method as claimed in claim 1, further comprising:
    entering a preview mode and then controlling the camera module to output only an image for preview prior to the capture key being pressed when a single output mode is activated.

4. The method as claimed in claim 1, wherein the first data is provided in a YUV format and the second data is provided in a Joint Photographic Coding Experts (JPEG) compressed format or a Moving Picture Experts Group (MPEG) compressed format.

5. An apparatus for capturing a real-time image in an electronic device, comprising:
    a camera module; and
    a controller to: control a camera module to simultaneously output first data for a preview image and second data for a capture image when a simultaneous output mode is activated; generate the preview image from the first data, which comprises processing the first data so as to resize an image represented by the first data to match a resolution of a display unit that displays the preview image; control displaying the resized image as the preview image; and temporarily store the second data in a memory, wherein as output by the camera module, the second data is higher resolution data than the first data;
    wherein when a capture key is pressed to finally capture an image at a time point at which a current preview image is displayed, the stored second data corresponding to the current preview image is retrieved as final capture image data.

6. The apparatus as claimed in claim 5, wherein the controller further controls displaying an indication of the simultaneous output mode when the simultaneous output mode is activated and displaying an indication of a single output mode when a single output mode is activated, wherein in the single output mode, only image data for a preview image is output by the camera module prior to the pressing of the capture key.

7. The apparatus as claimed in claim 5, wherein the first data for the preview image is obtained by converting a received image by the camera module to a YUV format.

8. The apparatus as claimed in claim 5, wherein when the output setting is a single output mode, the controller enters a preview mode and controls the camera module to output only an image for preview.

9. The apparatus as claimed in claim 5, wherein the first data is provided by the camera module in a YUV format and the second data is provided in a Joint Photographic Coding Experts (JPEG) compressed format or a Moving Picture Experts Group (MPEG) compressed format.

10. An electronic device, comprising:
a camera module having a simultaneous output mode and a single output mode;
a display unit;
a memory; and
a controller to: control the camera module to simultaneously output first data for a preview image and second data for a capture image during the simultaneous output mode; generate the preview image from the first data, which comprises processing the first data so as to resize an image represented by the first data to match a resolution of the display unit; control displaying the resized image as the preview image; and temporarily store the second data in a memory, wherein as output by the camera module, the second data is higher resolution data than the first data, and wherein when a capture key is pressed to finally capture an image at a time point in which a current preview image is displayed, the stored second data corresponding to the current preview image is retrieved as final capture image data.

11. The electronic device as claimed in claim 10, wherein the first data for the preview image is obtained by converting a received image by the camera module to a YUV format, and the second data is provided in a Joint Photographic Coding Experts (JPEG) compressed format or a Moving Picture Experts Group (MPEG) compressed format.

12. The electronic device as claimed in claim 10, wherein during the single output mode, the controller enters a preview mode and controls the camera module to output only an image for preview.

13. The electronic device as claimed in claim 10, wherein the controller further controls displaying an indication of the simultaneous output mode when the simultaneous output mode is activated and displaying an indication of the single output mode when the single output mode is activated, wherein in the single output mode, only data for the preview image is output by the camera module prior to the capture key being pressed.

* * * * *